United States Patent
Kim et al.

(10) Patent No.: US 10,483,553 B2
(45) Date of Patent: Nov. 19, 2019

(54) FUEL CELL INCLUDING A CARRIER-METAL NANOPARTICLE COMPLEX AND METHOD OF MANUFACTURING SAME

(71) Applicant: LG CHEM, LTD., Seoul (KR)

(72) Inventors: Kwanghyun Kim, Daejeon (KR); Gyo Hyun Hwang, Daejeon (KR); Sang Hoon Kim, Daejeon (KR); Jun Yeon Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 326 days.

(21) Appl. No.: 15/100,149

(22) PCT Filed: Nov. 27, 2014

(86) PCT No.: PCT/KR2014/011499
§ 371 (c)(1),
(2) Date: May 27, 2016

(87) PCT Pub. No.: WO2015/080497
PCT Pub. Date: Jun. 4, 2015

(65) Prior Publication Data
US 2017/0263941 A1    Sep. 14, 2017

(30) Foreign Application Priority Data
Nov. 29, 2013  (KR) ........................ 10-2013-0147138

(51) Int. Cl.
*H01M 4/92*    (2006.01)
*H01M 8/1018*    (2016.01)
(Continued)

(52) U.S. Cl.
CPC ............ *H01M 4/921* (2013.01); *B22F 1/0018* (2013.01); *H01M 4/8657* (2013.01);
(Continued)

(58) Field of Classification Search
CPC ........ H01M 4/926; H01M 4/92; H01M 4/925; H01M 4/9041; H01M 4/921; H01M 4/881;
(Continued)

(56) References Cited

U.S. PATENT DOCUMENTS

2003/0104936 A1    6/2003  Mao et al.
2004/0067847 A1    4/2004  Kato
(Continued)

FOREIGN PATENT DOCUMENTS

EP    2031683 A1    4/2009
EP    2810714 A1    10/2014
(Continued)

OTHER PUBLICATIONS

Weimin Zhang et al., "Localized growth of Pt on Pd as a bimetallic electrocatalyst with enhanced catalytic activity and durability for proton exchange membrane fuel cell", Electrochemistry Communications 34 (2013), 73-76, May 23, 2013, www.elsevier.com/locate/elecom.
(Continued)

*Primary Examiner* — Imran Akram
(74) *Attorney, Agent, or Firm* — Dentons US LLP

(57) ABSTRACT

The present application relates to a fuel cell and a method of manufacturing the same.

18 Claims, 8 Drawing Sheets

(51) Int. Cl.
    *H01M 4/90*     (2006.01)
    *H01M 4/86*     (2006.01)
    *H01M 4/88*     (2006.01)
    *B22F 1/00*     (2006.01)

(52) U.S. Cl.
    CPC ......... *H01M 4/881* (2013.01); *H01M 4/9041* (2013.01); *H01M 4/9083* (2013.01); *H01M 4/925* (2013.01); *H01M 4/926* (2013.01); *H01M 8/1018* (2013.01); *H01M 2008/1095* (2013.01)

(58) Field of Classification Search
    CPC ............. H01M 4/8647; H01M 4/8652; H01M 4/9083; B01J 23/42; B01J 23/44; B01J 21/18; B01J 35/0033; B01J 23/40; B01J 23/50; B01J 23/648; B01J 32/00; B01J 35/002; B01J 20/28069; B82Y 30/00
See application file for complete search history.

(56) References Cited

U.S. PATENT DOCUMENTS

| | | | |
|---|---|---|---|
| 2005/0075240 A1* | 4/2005 | Yamamoto | H01M 4/921 502/101 |
| 2007/0026294 A1 | 2/2007 | Shimazaki et al. | |
| 2008/0223712 A1 | 9/2008 | Min et al. | |
| 2010/0221136 A1* | 9/2010 | Maffia | B22F 3/1121 419/2 |
| 2010/0258759 A1 | 10/2010 | Archer et al. | |
| 2010/0316930 A1* | 12/2010 | Shao | H01M 4/921 429/482 |
| 2011/0275009 A1* | 11/2011 | Goto | B01J 23/42 429/506 |
| 2012/0208105 A1* | 8/2012 | Arai | H01M 4/921 429/524 |
| 2013/0130109 A1* | 5/2013 | Archer | B82Y 30/00 429/213 |
| 2013/0133483 A1* | 5/2013 | Yang | B22F 1/0018 75/351 |
| 2013/0149632 A1* | 6/2013 | Yoo | H01M 4/8621 429/487 |

FOREIGN PATENT DOCUMENTS

| | | |
|---|---|---|
| EP | 2998269 A1 | 3/2016 |
| EP | 3000781 A1 | 3/2016 |
| JP | 2004-127814 A | 4/2004 |
| JP | 2005193182 A | 7/2005 |
| KR | 10-2004-0054815 A | 6/2004 |
| KR | 10-0774590 B1 | 11/2007 |
| KR | 10-0823487 B1 | 4/2008 |
| WO | 2008048716 A2 | 4/2008 |
| WO | 2013168912 A1 | 11/2013 |
| WO | 2015069068 A1 | 5/2015 |

OTHER PUBLICATIONS

I. Alonso-Lemus et al., "Platinum Nanoparticles Synthesis Supported in Mesoporous Silica and Its Effect in MCM-41 Lattice", International Journal of Electrochemical Science, 6, Sep. 1, 2011, 4176-4187, www.electrochemsci.org.

Limiao Chen, Bimetallic AgM (M=Pt, Pd, Au) nanostructures: synthesis and applications for surface-enhanced Raman scattering, RSC Advances, Jan. 23, 2013, pp. 4391-4399.

* cited by examiner

[Figure 1]
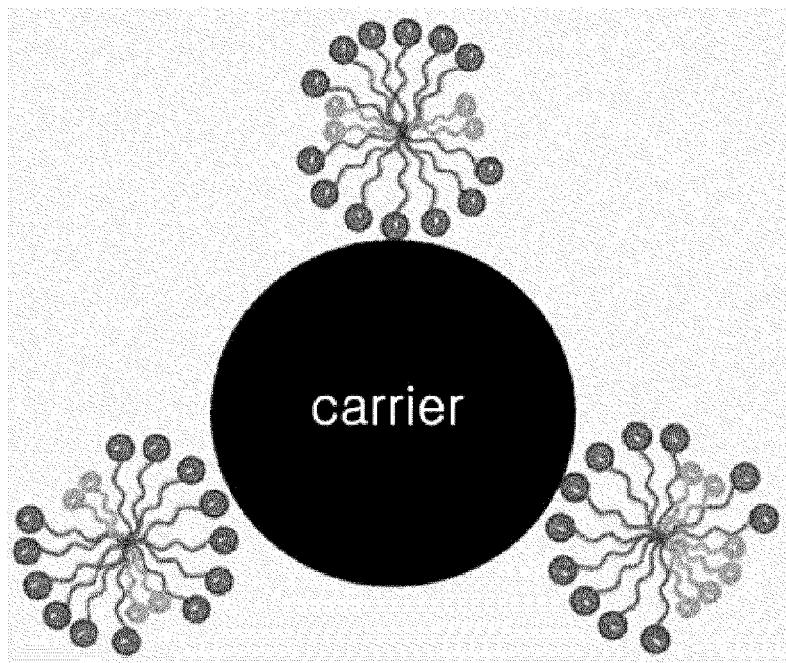

[Figure 2]
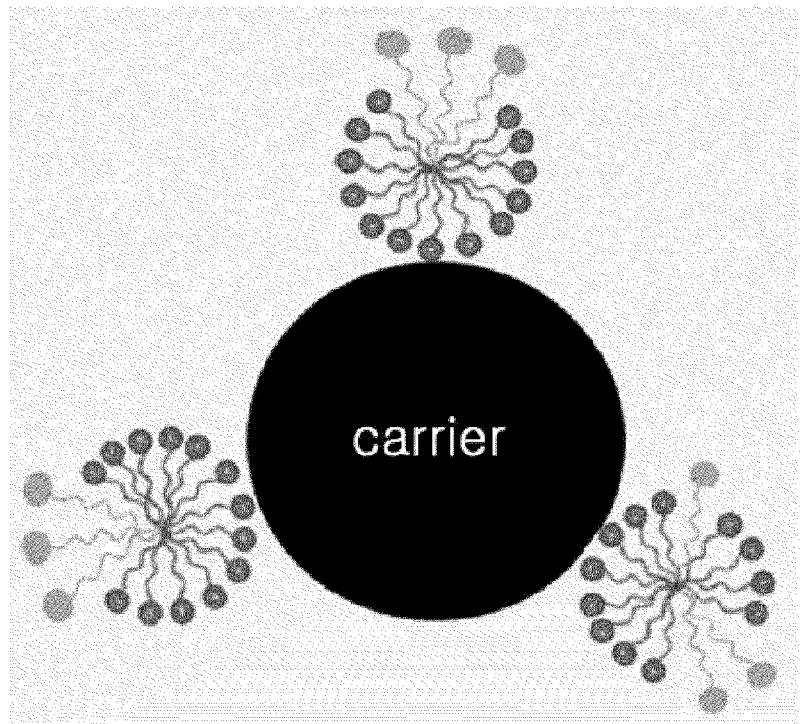
[Figure 3]
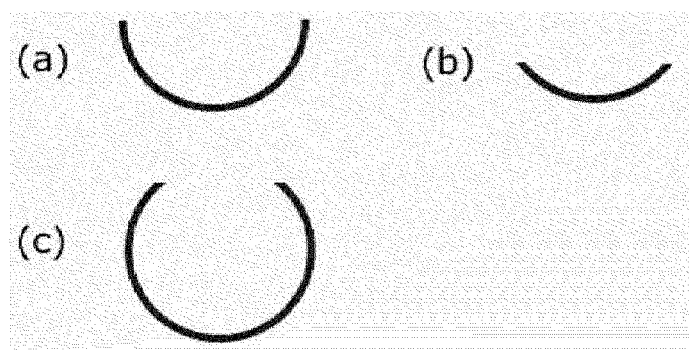

[Figure 4]
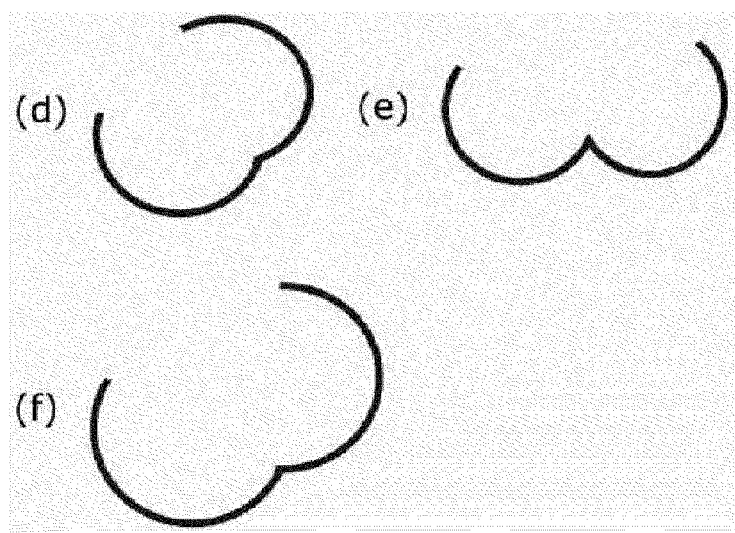
[Figure 5]
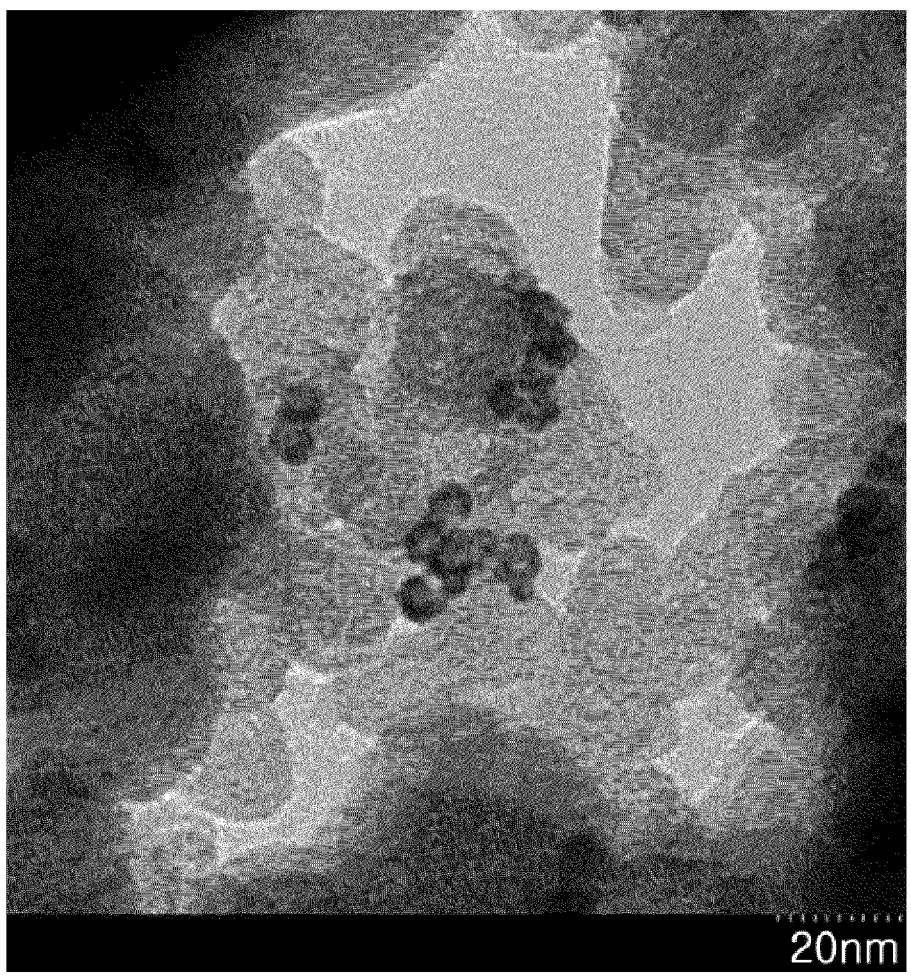

[Figure 6]
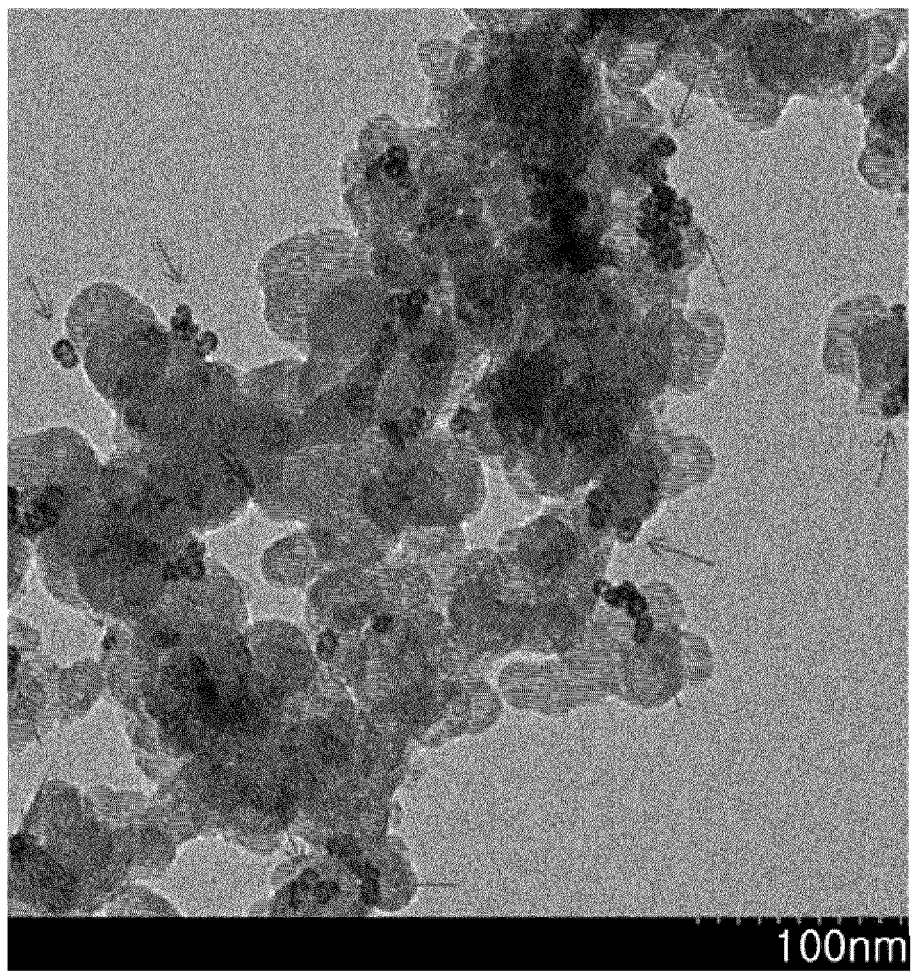

[Figure 7]
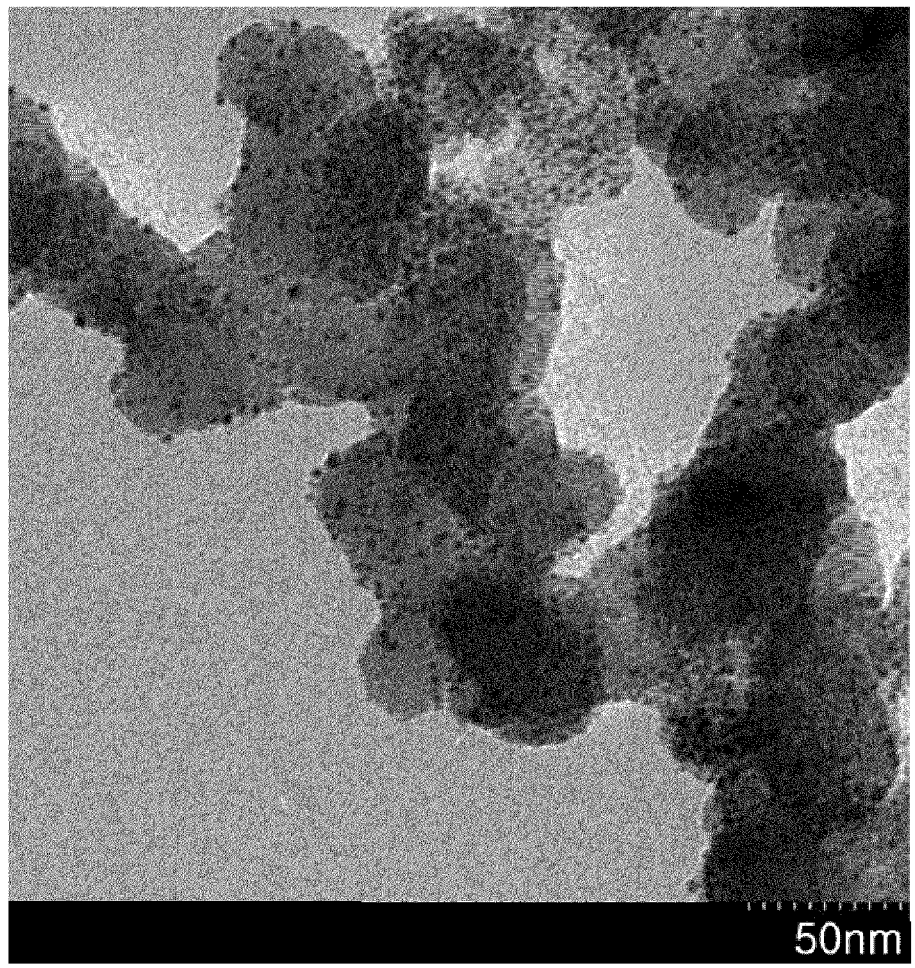
[Figure 8]
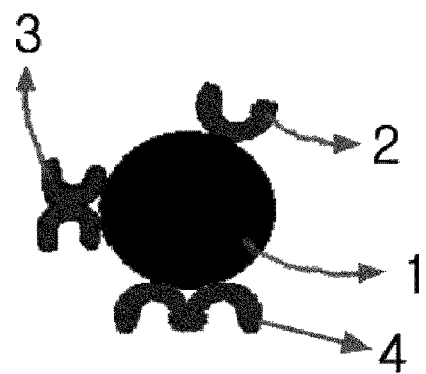

[Figure 9]
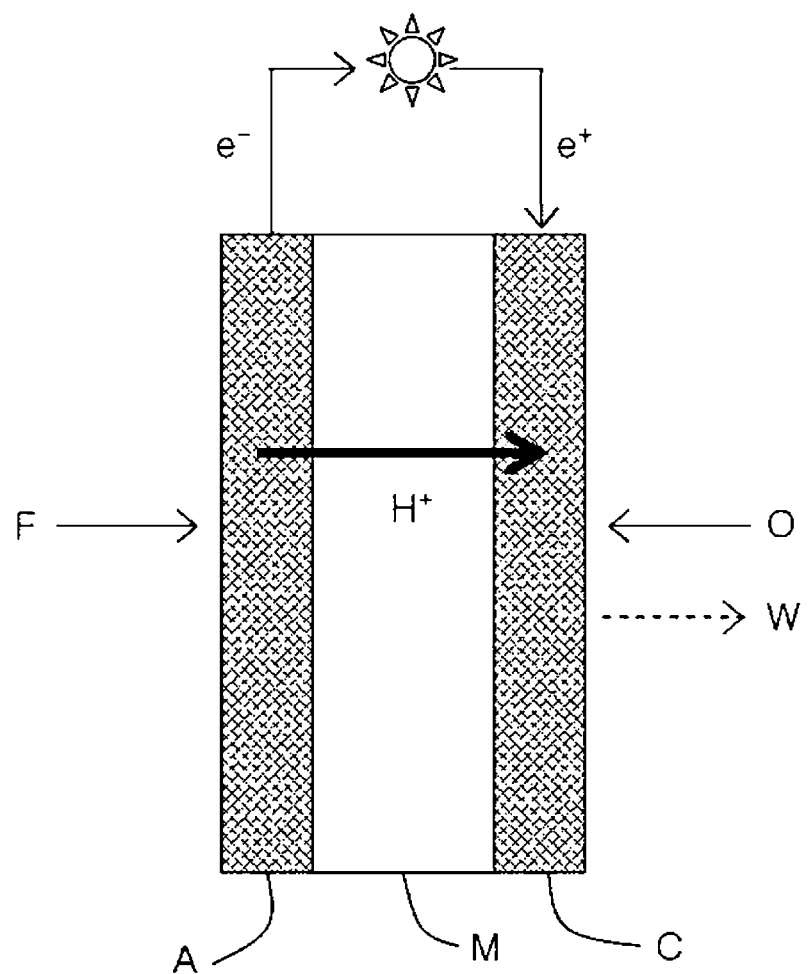

[Figure 10]
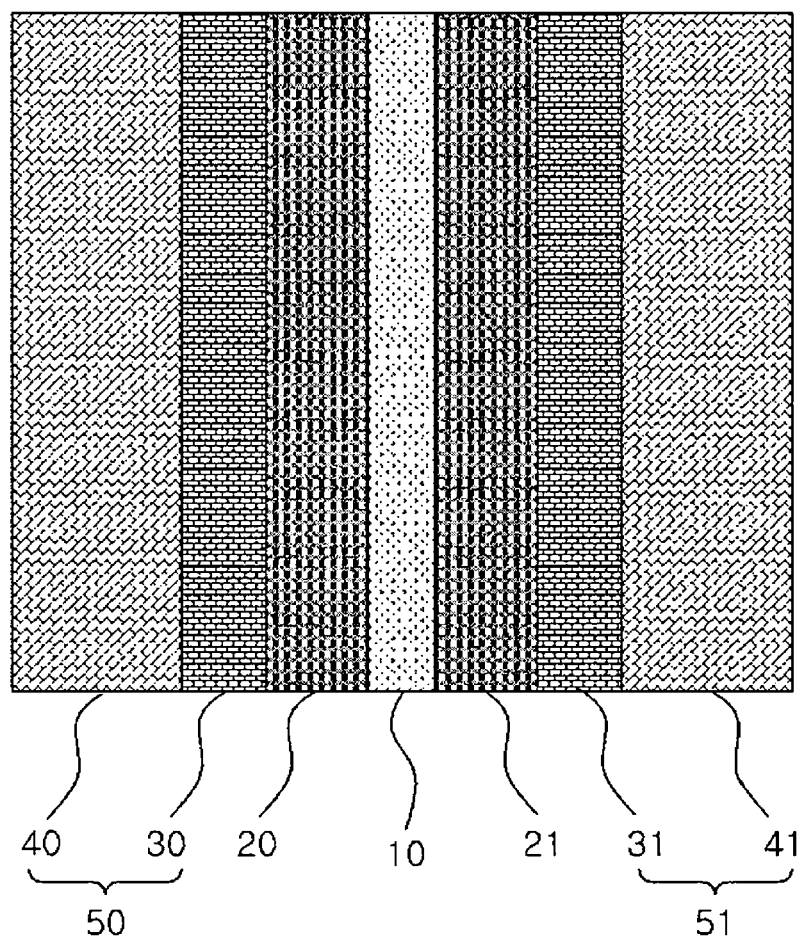

[Figure 11]
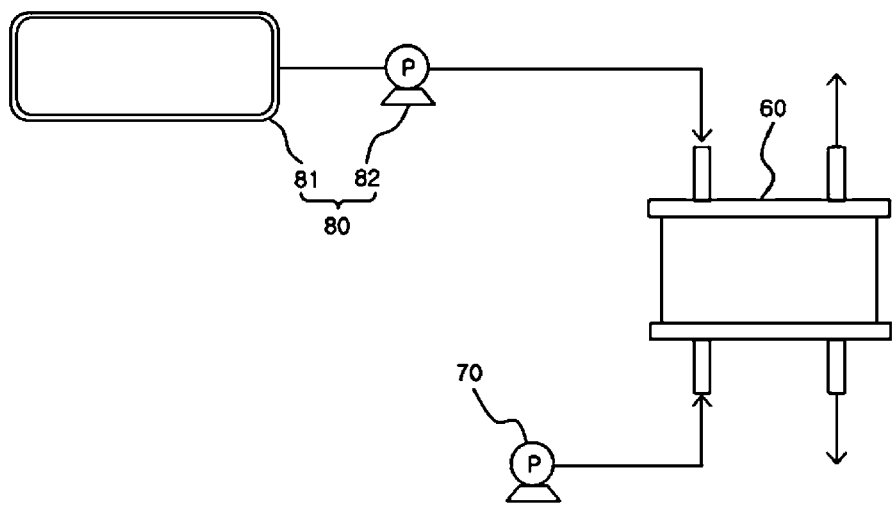

FUEL CELL INCLUDING A CARRIER-METAL NANOPARTICLE COMPLEX AND METHOD OF MANUFACTURING SAME

This application is a National Stage Application of International Application No. PCT/KR2014/011499, filed on Nov. 27, 2014, which claims the benefit of Korean Patent Application No. 10-2013-0147138 filed on Nov. 29, 2013, all of which are hereby incorporated by reference in their entirety for all purposes as if fully set forth herein.

TECHNICAL FIELD

This application claims priority to and the benefit of Korean Patent Application No. 10-2013-0147138 filed in the Korean Intellectual Property Office on Nov. 29, 2013, the entire contents of which are incorporated herein by reference.

The present application relates to a fuel cell and a method of manufacturing the same.

BACKGROUND ART

Recently, energy resources in the related art such as petroleum or coal have been expected to be exhausted, and thus an interest in energy that can replace the energy resources in the related art has been increased. A fuel cell as one of these alternative energies particularly receives attention due to merits in that the fuel cell has high efficiency, a pollutant such as $NO_x$ and $SO_x$ is not discharged, and used fuel is plentiful.

The fuel cell is an apparatus electrochemically reacting fuel and an oxidizing agent to generate electric energy. In the fuel cell, hydrogen is used as fuel, oxygen is used as the oxidizing agent, and an electrode is formed of an anode serving as a catalyst in a hydrogen oxidation reaction (HOR) and a cathode performing a catalytic action in an oxygen reduction reaction (ORR). In the fuel cell, the electrode includes a catalyst performing the aforementioned catalytic action, and platinum is generally used as a catalyst material. However, since platinum has problems in that cost is high and an allowance value with respect to an impurity is low, a lot of research has been conducted to manufacture and use a catalyst providing electrochemical activity and stability that are superior to those of pure platinum while reducing a use amount of platinum. In the aforementioned research, a plan for increasing activity of platinum itself or an electrode catalyst of an alloy type of platinum and a transition metal is mostly proposed, but recently, an interest in a nanoparticle structure type having electrochemical activity and stability has been increased.

Examples of a method of synthesizing metal nanoparticles include a method of reducing metal ions on a solution by a reducing agent, a method using a gamma ray, an electrochemical method, and the like, but in the methods in the related art, since it is difficult to synthesize nanoparticles having a uniform size and shape or an organic solvent is used, and thus it is difficult to perform mass production of high quality nanoparticles economically due to various reasons such as problems of environmental pollution, high costs, and the like.

Further, since the metal nanoparticles become easily unstable by a heat treatment temperature or a reaction temperature, there are many cases where the metal nanoparticles are dispersed in a carrier to be used. Therefore, there is a demand for development of a method of effectively carrying high quality metal nanoparticles having a uniform size in a carrier.

DETAILED DESCRIPTION OF THE INVENTION

Technical Problem

The problems to be solved by the present application are to provide a fuel cell including a carrier-metal nanoparticle complex where metal particles having a uniform nanosize are carried in a carrier as an electrode catalyst, and a method of manufacturing the same.

The problems to be solved by the present application are not limited to the aforementioned technical problems, and other unmentioned technical problems may be clearly understood by a person with skill in the art from the following description.

Technical Solution

The present application provides a fuel cell including: a cathode; an anode; and an electrolyte membrane provided between the cathode and the anode, in which at least one of the cathode and the anode includes a carrier-metal nanoparticle complex where metal nanoparticles including one or more bowl-type particles including a first metal and a second metal are carried in a carrier.

Further, the present application provides a method of manufacturing a fuel cell, the method including: preparing an electrolyte membrane; forming a cathode on one surface of the electrolyte membrane; and forming an anode on the other surface of the electrolyte membrane, in which at least one of the cathode and the anode includes a carrier-metal nanoparticle complex where metal nanoparticles including one or more bowl-type particles including a first metal and a second metal are carried in a carrier.

Advantageous Effects

In a fuel cell of the present application, at least one electrode includes a carrier-metal nanoparticle complex, and the carrier-metal nanoparticle is a complex where metal nanoparticles having a uniform size of several nanometers are carried in a carrier, and has excellent dispersivity and carrying ratio to the carrier of the metal nanoparticle, and thus may exhibit an excellent catalyst effect.

Further, there is a merit in that since the metal nanoparticle carried in the carrier includes one or more bowl-type particles, even an internal surface area of the metal nanoparticle may be utilized as a contact area where a reaction occurs by a bowl structure, and thus catalyst efficiency is significantly increased.

BRIEF DESCRIPTION OF DRAWINGS

FIGS. 1 and 2 schematically illustrate a state of formation of a micelle on a carrier by a surfactant in a process of manufacturing a carrier-metal nanoparticle complex according to an exemplary embodiment of the present application.

FIG. 3 illustrates examples of a cross-section of a bowl-type particle of the present application.

FIG. 4 illustrates examples of a cross-section of a metal nanoparticle where two bowl-type particles partially come into contact with each other according to the present application.

FIGS. 5 and 6 illustrate a transmission electron microscope (TEM) image of a metal nanoparticle according to the exemplary embodiment of the present application.

FIG. 7 illustrates a transmission electron microscope (TEM) image of a carrier-metal nanoparticle complex in the related art.

FIG. 8 schematically illustrates a structure of the carrier-metal nanoparticle complex according to the exemplary embodiment of the present application.

FIG. 9 schematically illustrates a generation principle of electricity of a fuel cell.

FIG. 10 schematically illustrates a structure of a membrane electrode assembly for a fuel cell according to the exemplary embodiment of the present application.

FIG. 11 schematically illustrates a fuel cell according to the exemplary embodiment of the present application.

BEST MODE

Advantages and characteristics of the present application, and methods for achieving them will be apparent by referring to embodiments described below in detail in addition to the accompanying drawings. However, the present application is not limited to the exemplary embodiments to be disclosed below but may be implemented in various different forms. Therefore, the exemplary embodiments introduced herein are provided to make disclosed contents of the present application thorough and complete and sufficiently transfer the spirit of the present invention to those skilled in the art, and the present application is just defined by the scope of the appended claims. The sizes and the relative sizes of constituent elements shown in the drawings may be exaggerated for clarity of description.

Unless otherwise defined, all terms used in the present application, including technical or scientific terms, have the same meanings as those commonly understood by those with ordinary skill in the technical field to which the present application belongs. Further, terms defined in a generally used dictionary are not interpreted to have ideal or excessively formal meanings unless clearly defined in the present invention.

Hereinafter, the present application will be described in more detail.

An exemplary embodiment of the present application provides a fuel cell including: a cathode; an anode; and an electrolyte membrane provided between the cathode and the anode, in which at least one of the cathode and the anode includes a carrier-metal nanoparticle complex where metal nanoparticles including one or more bowl-type particles including a first metal and a second metal are carried in a carrier.

The fuel cell according to the exemplary embodiment of the present application is a type where a catalyst layer of the anode and a catalyst layer of the cathode come into contact with the electrolyte membrane, and may be manufactured according to a general method known in the art. For example, the fuel cell may be manufactured by thermal compression at 100 to 400° C. in a state where the cathode; the anode; and the electrolyte membrane positioned between the cathode and the anode are in close contact with each other.

The anode may include an anode catalyst layer and an anode gas diffusion layer. The anode gas diffusion layer may include again an anode fine pore layer and an anode base material.

The cathode may include a cathode catalyst layer and a cathode gas diffusion layer. The cathode gas diffusion layer may include again a cathode fine pore layer and a cathode base material.

FIG. 9 schematically illustrates a generation principle of electricity of the fuel cell, and in the fuel cell, the most basic unit generating electricity is a membrane electrode assembly MEA which is constituted by an electrolyte membrane M, and an anode electrode A and a cathode electrode C formed on both surfaces of the electrolyte membrane M. Referring to FIG. 9 illustrating the generation principle of electricity of the fuel cell, in the anode electrode A, an oxidation reaction of fuel F such as hydrogen, methanol, or hydrocarbons such as butane occurs, and thus hydrogen ions ($H^+$) and electrons ($e^-$) are generated, and the hydrogen ions move through the electrolyte membrane M to the cathode electrode C. In the cathode electrode C, the hydrogen ions transferred through the electrolyte membrane M, the oxidizing agent O such as oxygen, and the electrons are reacted to generate water W. The electrons move to an external circuit by this reaction.

As described above, the membrane-electrode assembly MEA means an assembly of an electrode (the cathode and the anode) where an electrochemical catalyst reaction of fuel and air occurs and a polymer membrane where the hydrogen ions are transferred, and is a single integral unit where the electrode (the cathode and the anode) and the electrolyte membrane adhere.

FIG. 10 schematically illustrates a structure of a membrane electrode assembly for a fuel cell, and the membrane electrode assembly for the fuel cell includes an electrolyte membrane 10 and the anode and the cathode positioned to face each other while the electrolyte membrane 10 is interposed therebetween.

The anode is constituted by an anode catalyst layer 20 and an anode gas diffusion layer 50, and the anode gas diffusion layer 50 is constituted again by an anode fine pore layer 30 and an anode base material 40. Herein, the anode gas diffusion layer is provided between the anode catalyst layer and the electrolyte membrane.

The cathode is constituted by a cathode catalyst layer 21 and a cathode gas diffusion layer 51, and the cathode gas diffusion layer 51 is constituted again by a cathode fine pore layer 31 and a cathode base material 41. Herein, the cathode gas diffusion layer is provided between the cathode catalyst layer and the electrolyte membrane.

FIG. 10 illustrates the anode and the cathode divided into the catalyst layers and the gas diffusion layers, but the present application is not limited thereto and structures of the anode and the cathode may be changed if necessary.

At least one of the catalyst layer of the anode and the catalyst layer of the cathode may include the carrier-hollow metal nanoparticle complex as a catalyst. As the residue, the catalyst selected from the group consisting of platinum, ruthenium, osmium, a platinum-ruthenium alloy, a platinum-osmium alloy, a platinum-palladium alloy, and a platinum-transition metal alloy may be preferably used. The aforementioned catalysts themselves may be used, and may be used while being carried in a carbon-based carrier.

In the case where the carrier-hollow metal nanoparticle complex is used as the catalyst, since the hollow metal nanoparticle has a wide surface area by the hollow and the cavity, a reaction area is increased, and thus an effect of increasing catalyst activity may be secured, and moreover, performance of the fuel cell may be increased.

A process of introducing the catalyst layer may be performed by a general method known in the art, and for example, a catalyst ink may be directly applied on the electrolyte membrane or applied on the gas diffusion layer to form the catalyst layer. In this case, a coating method of the catalyst ink is not particularly limited, but spray coating, tape casting, screen printing, blade coating, die coating, or spin coating methods or the like may be used. The catalyst ink may be representatively formed of a catalyst, a polymer ionomer, and a solvent.

The gas diffusion layer serves as a current conductor and a movement passage of a reaction gas and water, and has a porous structure. Therefore, the gas diffusion layer may include a conductive base material. As the conductive base material, a carbon paper, a carbon cloth, or a carbon felt may be preferably used. The gas diffusion layer may further include a fine pore layer between the catalyst layer and the conductive base material. The fine pore layer may be used to improve performance of the fuel cell under a low humidification condition, and serves to reduce an amount of water emitted to the outside of the gas diffusion layer and thus allow the electrolyte membrane to be in a sufficient moistening state.

Specifically, the present application provides a polymer electrolyte-type fuel cell including a stack including one or two or more membrane-electrode assemblies and a bipolar plate interposed between the membrane-electrode assemblies; a fuel supply portion supplying fuel to the stack; and an oxidizing agent supply portion supplying an oxidizing agent to the stack.

The fuel cell according to the exemplary embodiment of the present application includes the stack, the fuel supply portion, and the oxidizing agent supply portion.

FIG. 11 schematically illustrates a structure of the fuel cell, and the fuel cell includes a stack 60, an oxidizing agent supply portion 70, and a fuel supply portion 80.

The stack 60 includes one or two or more membrane electrode assemblies described above, and in the case where two or more membrane electrode assemblies are included, the stack 60 includes a separator interposed therebetween. The separator serves to prevent the membrane electrode assemblies from being electrically connected and transfer fuel and the oxidizing agent supplied from the outside to the membrane electrode assembly.

The oxidizing agent supply portion 70 serves to supply the oxidizing agent to the stack 60. As the oxidizing agent, oxygen is representatively used, and oxygen or air injected by a pump 70 may be used.

The fuel supply portion 80 serves to supply fuel to the stack 60, and may be constituted by a fuel tank 81 storing fuel, and a pump 82 supplying fuel stored in the fuel tank 81 to the stack 60. As fuel, hydrogen or hydrocarbon fuel in a gas or liquid state may be used. Examples of hydrocarbon fuel may include methanol, ethanol, propanol, butanol, or a natural gas.

As the fuel cell, a polymer electrolyte fuel cell, a direct liquid fuel cell, a direct methanol fuel cell, a direct formic acid fuel cell, a direct ethanol fuel cell, a direct dimethylether fuel cell, or the like is feasible.

The exemplary embodiment of the present application provides a carrier-metal nanoparticle complex where metal nanoparticles including one or more bowl-type particles including a first metal and a second metal are carried in a carrier.

In the present application, the bowl type may mean that at least one curved line region is included in a cross-section. Alternatively, the bowl type may mean that a curved line region and a straight line region are mixed on a cross-section. Alternatively, the bowl type may be a hemisphere type, and the hemisphere type may not be a type divided so as to necessarily pass through the center of the sphere but may be a type where one region of the sphere is removed. Moreover, the sphere does not mean only a perfect sphere shape, but may include an approximately sphere shape. For example, the external surface of the sphere may not be flat, and the radius of curvature of the sphere may not be constant. Alternatively, the bowl-type particle of the present application may mean that regions corresponding to 30% to 80%, specifically 30% to 70%, and more specifically 40% to 70% of the hollow nanoparticle are not continuously formed.

FIG. 3 illustrates examples of the cross-section of the bowl-type particle according to the present application.

According to the exemplary embodiment of the present application, the metal nanoparticle may be constituted by the one bowl-type particle. In this case, the cross-section of the metal nanoparticle may be one of the cross-sections illustrated in FIG. 3.

According to the exemplary embodiment of the present application, the metal nanoparticle may be a type where the two bowl-type particles partially come into contact with each other.

The metal nanoparticle of the type where the two bowl-type particles of the present application partially come into contact with each other may be a type where a portion of the hollow nanoparticles is split.

FIG. 4 illustrates examples of a cross-section of the metal nanoparticle of the type where two bowl-type particles partially come into contact with each other of the present application.

According to the exemplary embodiment of the present application, a region where the bowl-type particles partially come into contact with each other may include a region where a slope of a tangent line is reversed. Specifically, the region where the bowl-type particles come into contact with each other may include the region where a sign of the slope of the tangent line is reversed. For example, the type where the two bowl-type particles partially come into contact with each other may be a "3"-shaped or "W"-shaped type, and may have a vertex at which the two particles come into contact with each other. Alternatively, the aforementioned type may be attained by splitting a portion of the sphere shape.

FIG. 8 schematically illustrates a structure of the carrier-metal nanoparticle complex according to the exemplary embodiment of the present application. Referring to FIG. 8, metal nanoparticles 2, 3, and 4 are carried in a carrier 1. The metal nanoparticle 2 of the metal nanoparticles may be an example constituted by the aforementioned one bowl-type particle, and the metal nanoparticles 3 and 4 may be an example of a type where the aforementioned two bowl-type particles partially come into contact with each other or a type where a portion of the hollow nanoparticles is split.

According to the exemplary embodiment of the present application, the particle diameter of the bowl-type particle may be 1 nm or more and 30 nm or less. Specifically, the particle diameter of the bowl-type particle may be 1 nm or more and 20 nm or less, and more specifically, the particle diameter of the bowl-type particle may be 3 nm or more and 10 nm or less.

There is a merit in that in the case where the particle diameter of the metal nanoparticle is 30 nm or less, the nanoparticles may be used in various fields. Further, it is more preferable that the particle diameter of the metal nanoparticle is 20 nm or less. Moreover, there is a merit in that in the case where the particle diameter of the metal nanoparticle is 10 nm or less, since a surface area of the particle is further increased, a possibility of applicability to various fields is further increased. For example, if the carrier-metal nanoparticle complex where the metal nanoparticle formed in the aforementioned particle diameter range is carried in the carrier is used as the catalyst, efficiency thereof may be significantly increased.

The particle diameter of the bowl-type particle of the present application may mean the longest distance on the straight line ranging from the region of one end of the bowl-type particle to another region. Alternatively, the particle diameter of the bowl-type particle may mean a particle diameter of a virtual sphere including the bowl-type particle.

According to the exemplary embodiment of the present application, when the metal nanoparticle is manufactured, one or more metal nanoparticles may be manufactured.

According to the exemplary embodiment of the present application, the bowl-type particle may be a single layer. In this case, the single layer may include both the first metal and the second metal.

According to the exemplary embodiment of the present application, in the case where the bowl-type particle is the single layer, the first metal and the second metal may exist in a mixed form. Moreover, in the case where the bowl-type particle is the single layer, the first metal and the second metal may be uniformly or non-uniformly mixed.

According to the exemplary embodiment of the present application, the bowl-type particle may be two or more layers. Specifically, according to the exemplary embodiment of the present application, in the case where the bowl-type particle is two or more layers, the bowl-type particle may include the first layer including the first metal; and the second layer including the second metal.

According to the exemplary embodiment of the present application, the first layer may include the first metal but may not include the second metal. Further, the second layer may include the second metal but may not include the first metal.

Further, according to the exemplary embodiment of the present application, in the first layer, a content of the first metal may be higher than a content of the second metal. Further, in the second layer, the content of the second metal may be higher than the content of the first metal.

According to the exemplary embodiment of the present application, the bowl-type particle may include the first layer where the content of the first metal is higher than the content of the second metal; and the second layer where the content of the second metal is higher than the content of the first metal.

Specifically, according to the exemplary embodiment of the present application, in the first layer, the content of the first metal may be highest in a region that is farthest from the second layer while facing the second layer and the content of the first metal may be gradually decreased as being close to the second layer. Further, in the first layer, the content of the second metal may be increased as being away from the second layer.

Further, according to the exemplary embodiment of the present application, in the second layer, the content of the second metal may be highest in a region that is farthest from the first layer while facing the first layer and the content of the second metal may be gradually decreased as being close to the first layer. Further, in the second layer, the content of the first metal may be increased as being away from the first layer.

Specifically, the metal nanoparticle may exist in a gradation state of the first metal and the second metal. In the first layer, the first metal may exist in the content of 50 vol % or more or 70 vol % or more in the region that is farthest from the second layer while facing the second layer, and in the second layer, the second metal may exist in the content of 50 vol % or more or 70 vol % or more in the region that is farthest from the first layer while facing the first layer.

According to the exemplary embodiment of the present application, an atomic percentage ratio of the first metal and the second metal may be 1:5 to 10:1. The atomic percentage ratio may be, in the case where the metal nanoparticle is formed of the first layer and the second layer, an atomic percentage ratio of the first metal of the first layer and the second metal of the second layer. Alternatively, the atomic percentage ratio may be, in the case where the metal nanoparticle is formed of the single layer including the first metal and the second metal, an atomic percentage ratio of the first metal and the second metal.

According to the exemplary embodiment of the present application, the thickness of the bowl-type particle may be more than 0 nm and 5 nm or less. Specifically, the thickness of the bowl-type particle may be more than 0 nm and 3 nm or less.

In the present application, the thickness of the bowl-type particle may mean the thickness of the metal layer forming the bowl-type particle. The metal layer may mean a shell including the metal, and the thickness of the bowl-type particle may be the thickness of the shell including the metal. Further, in an aspect of the shape, the thickness of the bowl-type particle may mean the thickness of the bowl surface of the bowl-type particle.

According to the exemplary embodiment of the present application, the first metal may be selected from the group consisting of a metal, a metalloid, a lanthanoid metal, and an actinoid metal belonging to Group III to XV on a periodic table. Specifically, the first metal may be selected from the group consisting of platinum (Pt); ruthenium (Ru); rhodium (Rh); molybdenum (Mo); osmium (Os); iridium (Ir); rhenium (Re); palladium (Pd); vanadium (V); tungsten (W); cobalt (Co); iron (Fe); selenium (Se); nickel (Ni); bismuth (Bi); tin (Sn); chromium (Cr); titanium (Ti); gold (Au); cerium (Ce); silver (Ag); and copper (Cu).

According to the exemplary embodiment of the present application, the second metal may be different from the first metal.

According to the exemplary embodiment of the present application, the second metal may be selected from the group consisting of a metal, a metalloid, a lanthanoid metal, and an actinoid metal belonging to Group III to XV on a periodic table. Specifically, the second metal may be selected from the group consisting of platinum (Pt); ruthenium (Ru); rhodium (Rh); molybdenum (Mo); osmium (Os); iridium (Ir); rhenium (Re); palladium (Pd); vanadium (V); tungsten (W); cobalt (Co); iron (Fe); selenium (Se); nickel (Ni); bismuth (Bi); tin (Sn); chromium (Cr); titanium (Ti); gold (Au); cerium (Ce); silver (Ag); and copper (Cu).

As specific examples, according to the exemplary embodiment of the present application, the first metal may be selected from the group consisting of platinum (Pt), silver (Ag), palladium (Pd), and gold (Au), and more specifically may be platinum (Pt). In this case, the second metal may be selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and more specifically may be nickel (Ni).

As other specific examples, according to the exemplary embodiment of the present application, the first metal may be selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and more specifically may be nickel (Ni). In this case, the second metal may be selected from the group consisting of platinum (Pt), silver (Ag), palladium (Pd), and gold (Au), and more specifically may be platinum (Pt).

According to the exemplary embodiment of the present application, the first metal or the second metal may be different from each other, and the first metal or the second metal may be nickel.

According to the exemplary embodiment of the present application, the first metal or the second metal may be different from each other, and the first metal or the second metal may be platinum.

According to the exemplary embodiment of the present application, the first metal may be nickel, and the second metal may be platinum.

According to the exemplary embodiment of the present application, the carrier may be a carbon-based material or an inorganic particulate.

The carbon-based material may be selected from the group consisting of a carbon nanotube (CNT), graphite, graphene, an activated carbon, a mesoporous carbon, a carbon black, a carbon nanofiber, a carbon nanowire, a carbon nanohorn, a carbon aerogel, a carbon nanoring, fullerene (C60), and super P.

Examples of the carbon black include a DENCA black, a KETJEN black, an acetylene black, or the like.

The carbon nanotube may include one of SWCNT, DWCNT, MWCNT, functionalized SWCNT, functionalized DWCNT, functionalized MWCNT, purified SWCNT, purified DWCNT, or purified MWCNT, or a mixture thereof. The carbon nanotube has a tube shape where a graphene sheet is rolled without a joint. The carbon nanotube where the number of tubes is one is called a single walled carbon nanotube (SWCNT), the carbon nanotube where two tubes are rolled is called a double-walled carbon nanotube (DWCNT), and the carbon nanotube where two or more tubes are rolled is called a multi-walled carbon nanotube (MWCNT).

The inorganic particulate may be selected from the group consisting of alumina, silica, titania, and zirconia.

According to the exemplary embodiment of the present application, in the carrier-metal nanoparticle complex, a carrying ratio of the metal nanoparticle to the carrier may be 10 wt % to 70 wt %.

Further, the exemplary embodiment of the present application provides a method of manufacturing a fuel cell, the method including: preparing an electrolyte membrane; forming a cathode on one surface of the electrolyte membrane; and forming an anode on the other surface of the electrolyte membrane, in which at least one of the cathode and the anode includes a carrier-metal nanoparticle complex where metal nanoparticles including one or more bowl-type particles including a first metal and a second metal are carried in a carrier.

According to the exemplary embodiment of the present application, at least one of the forming of the cathode and the forming of the anode may further include manufacturing the carrier-metal nanoparticle complex, and the manufacturing of the carrier-metal nanoparticle complex may include forming a solution including a solvent, a first metal salt providing a first metal ion or an atomic group ion including the first metal ion in the solvent, a second metal salt providing a second metal ion or an atomic group ion including the second metal ion in the solvent, a first surfactant forming a micelle in the solvent, and a second surfactant forming the micelle together with the first surfactant in the solvent; adding the carrier to the solution to perform agitation; and adding a reducing agent to the solution to form the metal nanoparticles on the carrier.

Hereinafter, the method of manufacturing the metal-nanoparticles according to the present application will be described in more detail.

The exemplary embodiment of the present application provides a method of manufacturing a carrier-metal nanoparticle complex, the method including: forming a solution including a solvent, a first metal salt providing a first metal ion or an atomic group ion including the first metal ion in the solvent, a second metal salt providing a second metal ion or an atomic group ion including the second metal ion in the solvent, a first surfactant forming a micelle in the solvent, and a second surfactant forming the micelle together with the first surfactant in the solvent; adding a reducing agent to the solution to form a metal nanoparticle; and adding a carrier to the solution to carry the metal nanoparticle in the carrier, in which the metal nanoparticle includes one or more bowl-type particles including a first metal and a second metal.

Further, the exemplary embodiment of the present application provides a method of manufacturing a carrier-metal nanoparticle complex, the method including: forming a solution including a solvent, a first metal salt providing a first metal ion or an atomic group ion including the first metal ion in the solvent, a second metal salt providing a second metal ion or an atomic group ion including the second metal ion in the solvent, a first surfactant forming a micelle in the solvent, and a second surfactant forming the micelle together with the first surfactant in the solvent; adding a carrier to the solution to perform agitation; and adding a reducing agent to the solution to form a metal nanoparticle on the carrier, in which the metal nanoparticle includes one or more bowl-type particles including a first metal and a second metal.

According to the exemplary embodiment of the present application, in the manufacturing method, a hollow core may be formed in the metal nanoparticle.

In the present application, the hollow means that a core portion of the metal nanoparticle is vacant. Further, the hollow may be used as the same meaning as the hollow core. The hollow may include terms such as hollows, holes, and voids.

According to the exemplary embodiment of the present application, the hollow may include a space where an internal material does not exist in a volume of 50 vol % or more, specifically 70 vol % or more, and more specifically 80 vol % or more. Alternatively, the hollow may include a space where 50 vol % or more, specifically 70 vol % or more, and more specifically 80 vol % or more of the inside are vacant. Alternatively, the hollow may include a space where internal porosity is 50 vol % or more, specifically 70 vol % or more, and more specifically 80 vol % or more.

In the present application, a shell or a shell portion may mean a metal layer constituting the metal nanoparticles including one or more bowl-type particles. Specifically, the shell or the shell portion may mean the metal nanoparticles including one or more bowl-type particles. The bowl-type particle may mean that the shell portion is a bowl type.

In the manufacturing method of the present application, the shell or the shell portion may mean a shell formed on the outside of the micelle. The shell may be formed by at least one of the first metal salt and the second metal salt.

Further, in the case where the shell or the shell portion includes various layers, the shell or the shell portion may be represented by a first shell, a second shell, and the like. The first shell may become the first layer of the metal nanoparticle, and the second shell may become the second layer of the metal nanoparticle.

The method of manufacturing the metal nanoparticle according to the exemplary embodiment of the present application has a merit in that since a reduction potential difference is not used, a reduction potential between the first metal ion and the second metal ion forming the shell is not considered. The manufacturing method of the present application uses the charge between the metal ions and thus is simpler than a method of manufacturing a metal nanoparticle using a reduction potential difference in the related art. Therefore, in the method of manufacturing the metal nanoparticle of the present application, mass production is easy, and the metal nanoparticle may be manufactured at low costs. Moreover, there is a merit in that since the reduction potential difference is not used, as compared to the method of manufacturing the metal nanoparticle in the related art, a limit to a used metal salt is reduced, and thus various metal salts may be used.

According to the exemplary embodiment of the present application, the forming of the solution may include forming the micelle on the solution by the first and second surfactants.

According to the exemplary embodiment of the present application, in the manufacturing method, the shell portion of the metal nanoparticle may be formed by the first metal ion or the atomic group ion including the first metal ion; and the second metal ion or the atomic group ion including the second metal ion.

According to the exemplary embodiment of the present application, the first metal ion or the atomic group ion including the first metal ion may have a charge that is contrary to a charge of an external end of the first surfactant, and the second metal ion or the atomic group ion including the second metal ion may have a charge that is the same as the charge of the external end of the first surfactant.

Therefore, the first metal ion or the atomic group ion including the first metal ion may be positioned in the external end of the first surfactant forming the micelle in the solution to form a shape surrounding an external surface of the micelle. Moreover, the second metal ion or the atomic group ion including the second metal ion may form a shape surrounding an external surface of the first metal ion or the atomic group ion including the first metal ion. The first metal salt and the second metal salt may form the shell portions including the first metal and the second metal, respectively, by a reducing agent.

In the present application, the external end of the surfactant may mean an external portion of the micelle of the first or second surfactant forming the micelle. The external end of the surfactant of the present application may mean a head of the surfactant. Further, the external end of the present application may determine the charge of the surfactant.

Further, the surfactant of the present application may be classified into an ionic type or a nonionic type according to a kind of the external end, and the ionic type may be a positive type, a negative type, a zwitterionic type, or an amphoteric type. The zwitterionic surfactant contains both positive and negative charges. If the positive and negative charges of the surfactant of the present application depend on a pH, the surfactant may be an amphoteric surfactant and may be zwitterionic in a predetermined pH range. Specifically, in the present application, an anionic surfactant may mean that the external end of the surfactant has the negative charge, and a cationic surfactant may mean that the external end of the surfactant has the positive charge.

According to the exemplary embodiment of the present application, in the metal nanoparticle manufactured by the aforementioned manufacturing method, the cavity may be formed in one or two or more regions of the shell portion.

In the present application, the cavity may mean an empty space continuing from one region of the external surface of the metal nanoparticle. The cavity of the present application may be formed in a type of one tunnel from one region of the external surface of the shell portion. The type of the tunnel may be a straight line, a continuous type of a curved line or a straight line, and a continuous type where a curved line and a straight line are mixed.

According to the exemplary embodiment of the present application, in the case where the metal nanoparticle includes the hollow, the cavity may be an empty space ranging from the external surface of the shell portion to the hollow.

According to the exemplary embodiment of the present application, in the case where the metal nanoparticles include one or more bowl-type particles, the cavity may mean the empty space where the shell portion is not formed.

The cavity of the present application may serve to utilize an internal surface area of the metal nanoparticle. Specifically, in the case where the metal nanoparticle is used for the purpose of the catalyst, the cavity may serve to increase a surface area that may come into contact with a reaction material. Therefore, due to the cavity, high activity of the metal nanoparticle may be attained.

According to the exemplary embodiment of the present application, the metal nanoparticle manufactured by the aforementioned manufacturing method may be the bowl-type particle, or a type where two or more bowl-type particles partially come into contact with each other.

The metal nanoparticle in the type of the bowl-type particle or the type where two or more bowl-type particles partially come into contact with each other of the present application may mean that the size of the cavity occupies 30% or more of the entire shell portion.

Further, the metal nanoparticle of the type where two or more bowl-type particles partially come into contact with each other may mean a type where the cavity is continuously formed and thus a portion of the metal nanoparticles is split.

Further, the bowl-type particle may mean that the cavity is continuously formed and thus 30% or more of the surface of the nanoparticle does not form the shell portion. Specifically, the bowl-type particle of the present application may mean that regions of 30% or more and 80% or less, specifically 30% or more and 70% or less, and more specifically 40% or more and 70% or less of the entire shell portion of the hollow nanoparticle are not continuously formed.

According to the exemplary embodiment of the present application, in the manufacturing method, a concentration; a chain length; an external end size; or a charge kind of the second surfactant may be adjusted to form the cavity in one or two or more regions of the shell portion.

According to the exemplary embodiment of the present application, the first surfactant may serve to form the micelle in the solution to form the shell portion by the metal ion or the atomic group ion including the metal ion, and the second surfactant may serve to form the cavity of the metal nanoparticle.

According to the exemplary embodiment of the present application, the forming of the solution may include adjusting the size or the number of cavities by changing concentrations of the first and second surfactants. Specifically, according to the exemplary embodiment of the present application, a mole concentration of the second surfactant may be 0.01 to 0.05 times of a mole concentration of the first surfactant. That is, the mole concentration of the second surfactant may be 1/100 to 1/20 times of the mole concentration of the first surfactant. Specifically, the mole concentration of the second surfactant may be 1/30 to 1/10 of the mole concentration of the first surfactant.

According to the exemplary embodiment of the present application, in the forming of the solution, the first surfactant and the second surfactant may form the micelle according to the aforementioned concentration ratio. The size or the number of the cavities of the metal nanoparticle may be adjusted by adjusting the mole concentration ratio of the first and second surfactants. Moreover, the metal nanoparticles including one or more bowl-type particles may be manufactured by continuously forming the cavities.

Further, according to the exemplary embodiment of the present application, the forming of the solution may include adjusting the size of the external end of the second surfactant to adjust the size of the cavity.

Further, according to the exemplary embodiment of the present application, the forming of the solution may include adjusting the chain length of the second surfactant to be different from the chain length of the first surfactant to thus form the cavity in the second surfactant region.

According to the exemplary embodiment of the present application, the chain length of the second surfactant may be 0.5 to 2 times of the chain length of the first surfactant. Specifically, the chain length may be determined by the number of carbon atoms.

According to the exemplary embodiment of the present application, the chain length of the second surfactant may be configured to be different from the chain length of the first surfactant to prevent the metal salt bonded to the external end of the second surfactant from forming the shell portion of the metal nanoparticle.

Further, according to the exemplary embodiment of the present application, the forming of the solution may include adjusting the charge of the second surfactant to be different from the charge of the first surfactant to form the cavity.

According to the exemplary embodiment of the present application, the first metal ion or the atomic group ion including the first metal ion having the charge that is contrary to the charge of the first and second surfactants may be positioned in the external ends of the first and second surfactants forming the micelle in the solvent. Further, the second metal ion having the charge that is opposite to the charge of the first metal ion may be positioned in the external surface of the first metal ion.

According to the exemplary embodiment of the present application, the first metal ion and the second metal ion formed in the external end of the first surfactant may form the shell portion of the metal nanoparticle, and the first metal ion and the second metal ion positioned in the external end of the second surfactant may not form the shell but form the cavity.

According to the exemplary embodiment of the present application, in the case where the first surfactant is the anionic surfactant, in the forming of the solution, the first surfactant may form the micelle, and the micelle may be surrounded by the cation of the first metal ion or the atomic group ion including the first metal ion. Moreover, the atomic group ion including the second metal ion of the anion may surround the cation. Moreover, in the adding of the reducing agent to form the metal nanoparticle, the cation surrounding the micelle may form the first shell, and the anion surrounding the cation may form the second shell.

Further, according to the exemplary embodiment of the present application, in the case where the first surfactant is the cationic surfactant, in the forming of the solution, the first surfactant may form the micelle, and the micelle may be surrounded by the anion of the atomic group ion including the first metal ion. Moreover, the second metal ion or the atomic group ion including the second metal ion of the cation may surround the anion. Moreover, in the adding of the reducing agent to form the metal nanoparticle, the anion surrounding the micelle may form the first shell, and the cation surrounding the anion may form the second shell.

According to the exemplary embodiment of the present application, the forming of the metal nanoparticle may include forming the hollow in the first and second surfactant regions forming the micelle.

According to the exemplary embodiment of the present application, both the first surfactant and the second surfactant may be the cationic surfactant.

Alternatively, according to the exemplary embodiment of the present application, both the first surfactant and the second surfactant may be the anionic surfactant.

According to the exemplary embodiment of the present application, in the case where the first and second surfactants have the same charge, the chain length of the second surfactant may be configured to be different from the chain length of the first surfactant to form the micelle.

Specifically, due to a chain length difference of the second surfactant, the first and second metal ions positioned in the external end of the second surfactant are not adjacent to the first and second metal ions positioned in the external end of the first surfactant, and thus the shell portion is not formed.

FIGS. 3 and 4 illustrate examples of the cross-section of the metal nanoparticle formed by the manufacturing method of the present application.

Specifically, FIG. 3 relates to the metal nanoparticle formed of one bowl-type particle. That is, in the region where the second surfactant is continuously distributed, the shell portion is not formed, and thus the bowl-type metal nanoparticle is formed.

Further, FIG. 4 relates to the metal nanoparticle where two bowl-type particles come into contact with each other. That is, in the region where the second surfactant is continuously distributed, the shell portion is not formed, and in the portion in which the bowl-type particles come into contact with each other, the second surfactant is distributed in a very small amount, and thus the shell portion may not be perfectly formed to form the type where bowl-type particles come into contact with each other. Further, two or more bowl-type particles may come into contact with each other to form the type of FIG. 4.

According to the exemplary embodiment of the present application, the first surfactant may be the anionic surfactant or the cationic surfactant, and the second surfactant may be the nonionic surfactant.

According to the exemplary embodiment of the present application, in the case where the second surfactant is the nonionic surfactant, since the metal ion is not positioned in the external end of the second surfactant, the cavity of the metal nanoparticle may be formed. Therefore, in the case where the second surfactant is nonionic, even though the chain length thereof is the same as or different from that of the first surfactant, the cavity of the metal nanoparticle may be formed.

According to the exemplary embodiment of the present application, the first surfactant may be the anionic surfactant or the cationic surfactant, and the second surfactant may be the zwitterionic surfactant.

According to the exemplary embodiment of the present application, in the case where the second surfactant is the zwitterionic surfactant, since the metal ion is not positioned in the external end of the second surfactant, the cavity of the metal nanoparticle may be formed. Therefore, in the case where the second surfactant is zwitterionic, even though the chain length thereof is the same as or different from that of the first surfactant, the cavity of the metal nanoparticle may be formed.

The anionic surfactant may be selected from the group consisting of sodiumhexane sulfonate, N-dodecyl-N,N-dimethyl-3-ammonio-1-propane sulfonate, sodium 1-heptane sulfonate, potassium laurate, triethanolamine stearate, ammonium lauryl sulfate, lithium dodecyl sulfate, sodium lauryl sulfate, sodium dodecyl sulfate, alkyl polyoxyethylene sulfate, sodium alginate, dioctyl sodium sulfosuccinate, phosphatidyl glycerol, phosphatidyl inositol, phosphatidylserine, phosphatidic acid and a salt thereof, glyceryl ester, sodium carboxymethylcellulose, bile acid and a salt thereof, cholic acid, deoxycholic acid, glycocholic acid, taurocholic acid, glycodeoxycholic acid, alkyl sulfonate, aryl sulfonate, alkyl phosphate, alkyl phosphonate, stearic acid and a salt thereof, calcium stearate, phosphate, carboxymethylcellulose sodium, dioctyl sulfosuccinate, dialkylester of sodium sulfosuccinic acid, phospholipid, and calcium carboxymethylcellulose. However, the anionic surfactant is not limited thereto.

The cationic surfactant may be selected from the group consisting of a quaternary ammonium compound, benzalkonium chloride, cetyltrimethylammonium bromide, chitosan, lauryldimethylbenzylammonium chloride, acyl carnitine hydrochloride, alkylpyridinium halide, cetyl pyridinium chloride, cationic lipid, polymethylmethacrylate trimethylammonium bromide, a sulfonium compound, polyvinylpyrrolidone-2-dimethylaminoethyl methacrylate dimethyl sulfate, hexadecyltrimethyl ammonium bromide, a phosphonium compound, benzyl-di(2-chloroethyl)ethylammonium bromide, coconut trimethyl ammonium chloride, coconut trimethyl ammonium bromide, coconut methyl dihydroxyethyl ammonium chloride, coconut methyl dihydroxyethyl ammonium bromide, decyl triethyl ammonium chloride, decyl dimethyl hydroxyethyl ammonium chloride bromide, ($C_{12}$-$C_{15}$)-dimethyl hydroxyethyl ammonium chloride, ($C_{12}$-$C_{15}$)-dimethyl hydroxyethyl ammonium chloride bromide, coconut dimethyl hydroxy ethyl ammonium chloride, coconut dimethyl hydroxyethyl ammonium bromide, myristyl trimethyl ammonium methylsulfate, lauryl dimethyl benzyl ammonium chloride, lauryl dimethyl benzyl ammonium bromide, lauryl dimethyl (ethenoxy)4 ammonium chloride, lauryl dimethyl (ethenoxy)4 ammonium bromide, N-alkyl($C_{12}$-$C_{18}$) dimethylbenzyl ammonium chloride, N-alkyl($C_{14}$-$C_{18}$) dimethyl-benzyl ammonium chloride, N-tetradecyldimethylbenzyl ammonium chloride monohydrate, dimethyl didecyl ammonium chloride, N-alkyl($C_{12}$-$C_{14}$) dimethyl 1-naphthylmethyl ammonium chloride, a trimethylammonium halide alkyl-trimethylammonium salt, a dialkyl-dimethylammonium salt, lauryl trimethyl ammonium chloride, an ethoxylated alkylamidoalkyldialkylammonium salt, an ethoxylated trialkyl ammonium salt, dialkylbenzene dialkylammonium chloride, N-didecyldimethyl ammonium chloride, N-tetradecyldimethylbenzyl ammonium chloride monohydrate, N-alkyl($C_{12}$-$C_{14}$) dimethyl 1-naphthylmethyl ammonium chloride, dodecyldimethylbenzyl ammonium chloride, dialkyl benzenealkyl ammonium chloride, lauryl trimethyl ammonium chloride, alkylbenzyl methyl ammonium chloride, alkyl benzyl dimethyl ammonium bromide, $C_{12}$ trimethylammonium bromide, $C_{15}$ trimethylammonium bromide, $C_{17}$ trimethylammonium bromide, dodecylbenzyltriethylammonium chloride, polydiallyldimethylammonium chloride, dimethylammonium chloride, alkyldimethylammonium halogenid, tricetylmethylammonium chloride, cetyltrimethylammonium bromide, decyltrimethylammonium bromide, dodecyltriethylammonium bromide, tetradecyltrimethylammonium bromide, methyl trioctylammonium chloride, POLYQUAT 10, tetrabutylammonium bromide, benzyltrimethylammonium bromide, choline ester, benzalkonium chloride, stearalkonium chloride, cetyl pyridinium bromide, cetyl pyridinium chloride, a halide salt of quaternized polyoxyethylalkylamine, "MIRAPOL" (polyquaternium-2), "Alkaquat" (alkyldimethylbenzylammonium chloride, manufactured by Rhodia), an alkyl pyridinium salt, amine, an amine salt, an imide azolinium salt, protonated quaternary acrylamide, a methylated quaternary polymer, a cationic guar gum, benzalkonium chloride, dodecyltrimethylammonium bromide, triethanol amine, and poloxamine. However, the cationic surfactant is not limited thereto.

The nonionic surfactant of the present application may be selected from the group consisting of polyoxyethylene fatty alcohol ether, polyoxyethylene sorbitan fatty acid ester, polyoxyethylene fatty acid ester, polyoxyethylene alkyl ether, a polyoxyethylene castor oil derivative, sorbitan ester, glyceryl ester, glycerol monostearate, polyethylene glycol, polypropylene glycol, polypropylene glycol ester, cetyl alcohol, cetostearyl alcohol, stearyl alcohol, arylalkyl polyether alcohol, a polyoxyethylenepolyoxypropylene copolymer, poloxamer, poloxamine, methyl cellulose, hydroxy cellulose, hydroxymethyl cellulose, hydroxyethyl cellulose, hydroxypropyl cellulose, hydroxypropylmethyl cellulose, hydroxypropylmethyl cellulose phthalate, amorphous cellulose, polysaccharides, starch, a starch derivative, hydroxyethyl starch, polyvinyl alcohol, triethanolamine stearate, amine oxide, dextran, glycerol, acacia gum, cholesterol, tragacanth, and polyvinylpyrrolidone.

The zwitterionic surfactant of the present application may be selected from the group consisting of betaine, alkyl betaine, alkylamido betaine, amidopropyl betaine, cocoamphocarboxy glycinate, sarcosinate aminopropionate, aminoglycinate, imidazolinium betaine, amphoteric imidazoline, N-alkyl-N,N-dimethylammonio-1-propane sulfonate, 3-cholamido-1-propyldimethylammonio-1-propane sulfonate, dodecylphosphocholine, and sulfo-betaine. However, the zwitterionic surfactant is not limited thereto.

According to the exemplary embodiment of the present application, the concentration of the first surfactant may be one time or more and five times or less of a critical micelle concentration with respect to the solvent. Specifically, the concentration of the first surfactant may be two times of the critical micelle concentration with respect to the solvent.

In the present application, the critical micelle concentration (CMC) means a lower limit of a concentration at which the surfactant forms a group (micelle) of molecules or ions in the solution.

The most important characteristic of the surfactant is that the surfactant has an adsorption tendency on an interface, for example, an air-liquid interface, an air-solid interface, and a liquid-solid interface. In the case where the surfactants are free, which means that the surfactant does not exist in an agglomeration form, the surfactants are called monomers or unimers, and if a concentration of the unimers is increased, the unimers are agglomerated to form an entity of small agglomerates, that is, the micelle. This concentration may be called the critical micelle concentration.

If the concentration of the first surfactant is less than one time of the critical micelle concentration, the concentration of the first surfactant adsorbed on the first metal salt may be relatively reduced. Accordingly, an amount of the formed core particles may be reduced overall. Meanwhile, if the concentration of the first surfactant is more than 5 times of the critical micelle concentration, the concentration of the first surfactant is relatively increased, and thus the metal nanoparticle forming the hollow core and the metal particle not forming the hollow core may be mixed to be agglomerated. Therefore, in the case where the concentration of the first surfactant is one time or more and five times or less of the critical micelle concentration with respect to the solvent, the metal nanoparticle may be smoothly formed.

According to the exemplary embodiment of the present application, the first surfactant forming the micelle and/or the first and second metal salts surrounding the micelle may be adjusted to adjust the size of the metal nanoparticle.

According to the exemplary embodiment of the present application, the size of the metal nanoparticle may be adjusted by the chain length of the first surfactant forming the micelle. Specifically, if the chain length of the first surfactant is short, the size of the micelle is reduced, and thus the size of the metal nanoparticle may be reduced.

According to the exemplary embodiment of the present application, the number of carbon atoms of the chain of the first surfactant may be 15 or less. Specifically, the number of carbon atoms of the chain may be 8 or more and 15 or less. Alternatively, the number of carbon atoms of the chain may be 10 or more and 12 or less.

According to the exemplary embodiment of the present application, a kind of counter ion of the first surfactant forming the micelle may be adjusted to adjust the size of the metal nanoparticle. Specifically, as the size of the counter ion of the first surfactant is increased, bonding force with a head portion of the external end of the first surfactant may be weakened to increase the size of the micelle, and thus the size of the metal nanoparticle may be increased.

According to the exemplary embodiment of the present application, in the case where the first surfactant is the anionic surfactant, the first surfactant may include $NH_4^+$, $K^+$, $Na^+$, or $Li^+$ as the counter ion.

Specifically, in the order of the case where the counter ion of the first surfactant is $NH_4^+$, the case where the counter ion of the first surfactant is $K^+$, the case where the counter ion of the first surfactant is $Na^+$, and the case where the counter ion of the first surfactant is $Li^+$, the size of the metal nanoparticle may be reduced.

According to the exemplary embodiment of the present application, in the case where the first surfactant is the cationic surfactant, the first surfactant may include $I^-$, $Br^-$, or $Cl^-$ as the counter ion.

Specifically, in the order of the case where the counter ion of the first surfactant is $I^-$, the case where the counter ion of the first surfactant is $Br^-$, and the case where the counter ion of the first surfactant is $Cl^-$, the size of the metal nanoparticle may be reduced.

According to the exemplary embodiment of the present application, the size of the head portion of the external end of the first surfactant forming the micelle may be adjusted to adjust the size of the metal nanoparticle. Moreover, in the case where the size of the head portion of the first surfactant formed on the external surface of the micelle is increased, repulsive force between the head portions of the first surfactant may be increased to increase the size of the micelle, and thus the size of the metal nanoparticle may be increased.

According to the exemplary embodiment of the present application, the size of the metal nanoparticle may be determined by a complex action of the aforementioned elements.

According to the exemplary embodiment of the present application, the metal salt is not particularly limited as long as the metal salt is ionized on the solution to provide the metal ion. The metal salt may be ionized in a solution state to provide the cation including the metal ion or the anion of the atomic group ion including the metal ion. The first metal salt and the second metal salt may be different from each other. Specifically, the first metal salt may provide the cation including the metal ion, and the second metal salt may provide the anion of the atomic group ion including the metal ion. Specifically, the first metal salt may provide the cation of $Ni^{2+}$, and the second metal salt may provide the anion of $PtCl_4^{2-}$.

According to the exemplary embodiment of the present application, the first metal salt and the second metal salt are not particularly limited as long as the first metal salt and the second metal salt are ionized on the solution to provide the metal ion or the atomic group ion including the metal ion.

According to the exemplary embodiment of the present application, the first metal salt and the second metal salt may be each independently a salt of one selected from the group consisting of a metal, a metalloid, a lanthanoid metal, and an actinoid metal belonging to Group III to XV on a periodic table.

Specifically, the first metal salt and the second metal salt are different from each other, and may be each independently a salt of a metal selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu).

More specifically, according to the exemplary embodiment of the present application, the first metal salt may be a salt of a metal selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and even more specifically may be a salt of nickel (Ni).

More specifically, according to the exemplary embodiment of the present application, the second metal salt may be a salt of a metal selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). More specifically, the second metal salt may be a salt of a metal consisting of platinum (Pt), palladium (Pd), and gold (Au), and even more specifically may be a salt of platinum (Pt).

According to the exemplary embodiment of the present application, the first metal salt and the second metal salt may be each independently nitrates, halides such as chlorides, bromides, and iodides, hydroxides, or sulfates of the metal. However, the first metal salt and the second metal salt are not limited thereto.

According to the exemplary embodiment of the present application, in the forming of the solution, a mole ratio of the first metal salt and the second metal salt may be 1:5 to 10:1. Specifically, the mole ratio of the first metal salt and the second metal salt may be 2:1 to 5:1.

If a mole number of the first metal salt is smaller than a mole number of the second metal salt, it is difficult for the first metal ion to form the first shell including the hollow. Further, if the mole number of the first metal salt is more than 10 times of the mole number of the second metal salt, it is difficult for the second metal ion to form the second shell surrounding the first shell. Therefore, in the aforementioned range, the first and second metal ions may smoothly form the shell portion of the metal nanoparticle.

According to the exemplary embodiment of the present application, the forming of the solution may further include adding a stabilizer.

Examples of the stabilizer may include one or a mixture of two or more selected from the group consisting of disodium phosphate, dipotassium phosphate, disodium citrate, and trisodium citrate.

According to the exemplary embodiment of the present application, the adding of the carrier to the solution to perform agitation may be performed for 5 minutes to 120 minutes, more specifically 10 minutes to 90 minutes, even more specifically 20 minutes to 60 minutes.

In the manufacturing method according to the exemplary embodiment of the present application, the carrier is the same as that described in the above.

According to the exemplary embodiment of the present application, the adding of the carrier may include dispersing the carrier in the solvent. Specifically, if the carrier is dispersed in the solvent and then added to the solution, an entanglement phenomenon of the carrier and the particles may be suppressed.

In the manufacturing method of the present application, in the carrier-metal nanoparticle complex, the formed metal nanoparticles may be carried in the carrier. In this case, there is a merit in that among the formed metal nanoparticles, only the metal nanoparticles according to the necessity may be selectively carried in the carrier. Further, there is a merit in that a portion of the carrier in which the metal nanoparticles are carried may be selected according to the necessity.

In the manufacturing method of the present application, in the carrier-metal nanoparticle complex, the metal nanoparticles may be formed on the carrier. In this case, there is a merit in that before the metal nanoparticle is formed, the first metal salt and the second metal salt are dispersed in the carrier, and thus the metal salts are uniformly dispersed. Accordingly, when the metal nanoparticles are formed, the particles are less agglomerated. Further, there is a merit in that adhesion force or bonding force between the carrier and the metal nanoparticle is increased.

According to the exemplary embodiment of the present application, the forming of the metal nanoparticle may include further adding the nonionic surfactant together with the reducing agent.

The nonionic surfactant may be adsorbed on the surface of the shell to uniformly disperse the metal nanoparticles formed in the solution. Therefore, the nonionic surfactant may prevent the metal particles from being precipitated by wadding or agglomeration and form the metal nanoparticles having a uniform size. Specific examples of the nonionic surfactant are the same as the aforementioned examples of the nonionic surfactant.

According to the exemplary embodiment of the present application, the solvent may be a solvent including water. Specifically, according to the exemplary embodiment of the present application, the solvent dissolves the first metal salt and the second metal salt, and may be water or a mixture of water and alcohol having 1 to 6 carbon atoms, and more specifically water.

In the manufacturing method according to the present application, in the case where water is used as the solvent, in the manufacturing process, a post-treatment process of treating the organic solvent is not required, and thus cost reduction and environmental pollution prevention effects are attained.

According to the exemplary embodiment of the present application, the manufacturing method may be performed at room temperature. Specifically, the manufacturing method may be performed at a temperature in the range of 4° C. or more and 35° C. or less and more specifically 15° C. or more and 28° C. or less.

In the exemplary embodiment of the present application, the forming of the solution may be performed at room temperature, specifically the temperature in the range of 4° C. or more and 35° C. or less, and more specifically 15° C. or more and 28° C. or less. There is a problem in that if the organic solvent is used as the solvent, manufacturing should be performed at a high temperature of more than 100° C. In the present application, since manufacturing may be performed at room temperature, the manufacturing method is simple, and thus there is a merit in terms of a process and a cost reduction effect is large.

According to the exemplary embodiment of the present application, the forming of the solution may be performed for 5 minutes to 120 minutes, more specifically 10 minutes to 90 minutes, even more specifically 20 minutes to 60 minutes.

According to the exemplary embodiment of the present application, the adding of the reducing agent and/or the nonionic surfactant to the solution to form the metal nanoparticle may be performed at room temperature and specifically a temperature in the range of 4° C. or more and 35° C. or less. In the manufacturing method according to the present application, since manufacturing may be performed at room temperature, the manufacturing method is simple, and thus there is a merit in terms of a process and a cost reduction effect is large.

The forming of the metal nanoparticle may be performed by reacting the solution and the reducing agent and/or the nonionic surfactant for a predetermined time, specifically 5 minutes to 120 minutes, more specifically 10 minutes to 90 minutes, and even more specifically 20 minutes to 60 minutes.

According to the exemplary embodiment of the present application, a standard reduction potential of the reducing agent may be −0.23 V or less.

The reducing agent is not particularly limited as long as the reducing agent is a strong reducing agent having standard reduction of −0.23 V or less and specifically −4 V or more and −0.23 V or less and has reducing power capable of reducing molten metal ions to precipitate metal particles. Specifically, the reducing agent may be at least one selected from the group consisting of $NaBH_4$, $NH_2NH_2$, $LiAlH_4$, and $LiBEt_3H$.

In the case where a weak reducing agent is used, since it is difficult to perform a continuous process because of a slow reaction speed and requirement of subsequent heating of the solution, a problem may exist in mass production, and particularly, there is a problem in that in the case where ethylene glycol that is a kind of weak reducing agent is used, productivity in a continuous process is low due to a reduction in flow speed by a high viscosity. Therefore, in the case where the reducing agent of the present application is used, the aforementioned problems may be overcome.

According to the exemplary embodiment of the present application, the manufacturing method may further include, after forming the metal nanoparticle, removing the surfactant in the hollow. A removing method is not particularly limited, and for example, a washing method by water may be used. The surfactant may be the anionic surfactant and/or the cationic surfactant.

According to the exemplary embodiment of the present application, the manufacturing method may further include, after forming the metal nanoparticle or removing the surfactant in the hollow, adding an acid to the metal nanoparticle to remove the cationic metal. In this step, if the acid is added to the metal nanoparticle, a 3d band metal is eluted. The cationic metal may be specifically selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu).

According to the exemplary embodiment of the present application, the acid is not particularly limited, and for example, an acid selected from the group consisting of a sulfuric acid, a nitric acid, a hydrochloric acid, a perchloric acid, a hydriodic acid, and a hydrobromic acid may be used.

According to the exemplary embodiment of the present application, after the metal nanoparticle is formed, in order to precipitate the metal nanoparticle included in the solution, the solution including the metal nanoparticle may be subjected to centrifugation. After centrifugation, only the separated metal nanoparticle may be collected. If necessary, a firing process of the metal nanoparticle may be further performed.

The nanoparticle of the present application may be generally used instead of a nanoparticle in the related art in a field where the nanoparticle may be used. In the metal nanoparticle of the present application, as compared to the nanoparticle in the related art, since the size is very small and a specific surface area is wider, excellent activity may be exhibited as compared to the nanoparticle in the related art. Specifically, the metal nanoparticle of the present application may be used in various fields such as a catalyst, a drug delivery, and a gas sensor. The nanoparticle is a catalyst, and may be used as an active material medicine in cosmetics, insecticides, animal nutritional supplements, or food supplements, and may be used as a pigment in electronic goods, optical goods, or polymers.

Hereinafter, the present application will be specifically described in detail through Examples. However, the Examples according to the present application may be modified in various other forms, and the scope of the present application is not interpreted to be limited to the Examples as will be described in detail below. The Examples of the present application are provided to more fully describe the present application to the person with ordinary skill in the art.

In the following Examples, the first metal salt is the salt including the first metal ion that is the precursor of the first metal or the atomic group ion including the first metal ion, and may serve to provide the first metal. Further, the second metal salt is the salt including the second metal ion that is the precursor of the second metal or the atomic group ion including the second metal ion, and may serve to provide the second metal.

Example $Ni(NO_3)_2$ as the first metal salt, $K_2PtCl_4$ as the second metal salt, ammonium lauryl sulfate (ALS) as the first surfactant, sodium hexanesulfonate as the second surfactant, and trisodium citrate as the stabilizer were added to distilled water to form the solution, followed by agitation for 30 minutes. In this case, the mole ratio of $K_2PtCl_4$ and $Ni(NO_3)_2$ was 1:3, the concentration of ALS was two times of the critical micelle concentration (CMC) with respect to water, and the mole ratio of sodium hexanesulfonate was 1:1.

Continuously, $NaBH_4$ was added as the reducing agent to perform the reaction for 30 minutes. Thereafter, the carbon (carbon black (Vulcan XC 72)) dispersed in distilled water was added to the solution to perform agitation for 30 minutes.

Thereafter, centrifugation was performed at 10,000 rpm for 10 minutes to remove the supernatant of the upper layer, the residual precipitate was re-dispersed in distilled water, and the centrifugation process was repeated to manufacture the carrier-metal nanoparticle complex of the present application.

The transmission electron microscope (TEM) images of the carrier-metal nanoparticle complexes manufactured according to the Example are illustrated in FIGS. 5 and 6.

As illustrated in FIGS. 5 and 6, it can be confirmed that the metal nanoparticles of the carrier-metal nanoparticle complex according to the present application are formed in a bowl type on the carrier. Specifically, the metal nanoparticles including one or more bowl-type particles were represented by the arrows in FIG. 6. On the other hand, FIG. 7 is the transmission electron microscope (TEM) image of the carrier-metal nanoparticle complex in the related art, and it can be confirmed that the metal nanoparticle has the sphere shape of the solid.

Therefore, in the fuel cell according to the exemplary embodiment of the present application, the carrier-metal nanocomplex may be included as the catalyst in at least one electrode of the cathode and the anode to increase catalyst activity by the wide surface area and high carrier dispersivity of the nanoparticle, and moreover, increase performance of the fuel cell.

Although the exemplary embodiments of the present application are described with reference to the accompanying drawings, the present application is not limited to the exemplary embodiments but may be manufactured in various different forms, and it will be appreciated by those skilled in the art that various modifications and changes may be performed in other specific forms without departing from the technical spirit or essential feature of the application. Therefore, it should be understood that the above exemplary embodiments are illustrative in all aspects but are not limitative.

DESCRIPTION OF REFERENCE NUMERALS

1: Carrier
2, 3, 4: Metal nanoparticle
10: Electrolyte membrane
20, 21: Catalyst layer 30, 31: Fine pore layer
40, 41: Electrode base material
50, 51: Gas diffusion layer
60: Stack
70: Oxidizing agent supply portion
80: Fuel supply portion
81: Fuel tank
82: Pump

The invention claimed is:

1. A fuel cell comprising:
a cathode;
an anode; and
an electrolyte membrane provided between the cathode and the anode,
wherein at least one of the cathode and the anode includes a carrier-metal nanoparticle complex comprising metal nanoparticles including two or more bowl-type particles including a first metal and a second metal on a carrier,
wherein:
the bowl-type particles are hollow, and comprise a non-continuous shell with a region in the shell from 30% to 80% of the entire shell where the shell is not formed, wherein the shell comprises:
a) a layer comprising the first metal and the second metal, wherein the the first metal and the second metal are uniformly or non-uniformly mixed; or
b) a first layer comprising the first metal and a second layer comprising the second metal.

2. The fuel cell of claim 1, wherein the metal nanoparticles are a type where two bowl-type particles partially come into contact with each other.

3. The fuel cell of claim 2, wherein a region where the two bowl-type particles partially come into contact with each other includes a region where a slope of a tangent line to that region for one bowl-type particle is reversed from a slope of a tangent line to that region for the other bowl-type particle.

4. The fuel cell of claim 1, wherein a particle diameter of each bowl-type particle is independently 1 nm or more and 20 nm or less.

5. The fuel cell of claim 1, wherein when a thickness of the bowl-type particle is a thickness of the shell which is more than 0 nm and 5 nm or less.

6. The fuel cell of claim 1, wherein at least one bowl-type particle includes multiple layers each comprising the first metal and the second metal, wherein a first layer includes a content of the first metal that is higher than a content of the second metal, and a second layer includes a content of the second metal that is higher than a content of the first metal.

7. The fuel cell of claim 1, wherein an atomic percentage ratio of the first metal and the second metal in each bowl-type particle is 1:5 to 10:1.

8. The fuel cell of claim 1, wherein the first metal and the second metal in each bowl-type particle are each independently any one selected from the group consisting of a metal, a metalloid, a lanthanoid metal, and an actinoid metal belonging to Group III to XV on a periodic table.

9. The fuel cell of claim 1, wherein the first metal and the second metal in each bowl-type particle are each independently any one selected from the group consisting of platinum (Pt); ruthenium (Ru); rhodium (Rh); molybdenum (Mo); osmium (Os); iridium (Ir); rhenium (Re); palladium (Pd); vanadium (V); tungsten (W); cobalt (Co); iron (Fe); selenium (Se); nickel (Ni); bismuth (Bi); tin (Sn); chromium (Cr); titanium (Ti); gold (Au); cerium (Ce); silver (Ag); and copper (Cu).

10. The fuel cell of claim 1, wherein the carrier is a carbon-based material or an inorganic particulate.

11. The fuel cell of claim 10, wherein the carbon-based material is at least one selected from the group consisting of a carbon black, a carbon nanotube (CNT), a graphite, a graphene, an activated carbon, a mesoporous carbon, a carbon fiber, and a carbon nanowire.

12. The fuel cell of claim 10, wherein the inorganic particulate is at least one selected from the group consisting of alumina, silica, titania, and zirconia.

13. The fuel cell of claim 1, wherein an amount of the metal nanoparticles on the carrier in the carrier-metal nanoparticle complex is 10 wt % to 70 wt % based on the weight of the carrier-metal nanoparticle complex.

14. The fuel cell of claim 1, wherein the first metal and the second metal in each bowl-type nanoparticle are different from each other, and the first metal or the second metal is nickel.

15. The fuel cell of claim 1, wherein the first metal and the second metal in each bowl-type nanoparticle are different from each other, and the first metal or the second metal is platinum.

16. The fuel cell of claim 1, wherein in each bowl-type nanoparticle the first metal is nickel and the second metal is platinum.

17. A method of manufacturing a fuel cell, the method comprising:
preparing an electrolyte membrane;
forming a cathode on one surface of the electrolyte membrane; and
forming an anode on the other surface of the electrolyte membrane,
wherein at least one of the cathode and the anode includes a carrier-metal nanoparticle complex where metal nanoparticles including one or more bowl-type particles including a first metal and a second metal are carried in a carrier,
wherein:
the bowl-type particles are hollow, and comprise a non-continuous shell with a region in the shell from 30% to 80% of the entire shell where the shell is not formed, wherein the shell comprises:
a) a layer comprising the first metal and the second metal, wherein the the first metal and the second metal are uniformly or non-uniformly mixed; or
b) a first layer comprising the first metal and a second layer comprising the second metal.

18. The method of claim 17, wherein at least one of the forming of the cathode and the forming of the anode further includes manufacturing the carrier-metal nanoparticle complex, and
the manufacturing of the carrier-metal nanoparticle complex includes forming a solution including a solvent, a first metal salt providing a first metal ion or an atom group ion including the first metal ion in the solvent, a second metal salt providing a second metal ion or an atom group ion including the second metal ion in the solvent, a first surfactant forming a micelle in the solvent, and a second surfactant forming the micelle together with the first surfactant in the solvent;
adding the carrier to the solution to perform agitation; and
adding a reducing agent to the solution to form the metal nanoparticles on the carrier.

* * * * *